Oct. 17, 1967　　P. C. ANDERSON ET AL　　3,347,212

TIME CONTROLLED LIQUID DISPENSER

Filed April 6, 1966　　2 Sheets-Sheet 1

INVENTORS—
Philip C. Anderson and
Frank Lothrop,
BY Richards and Cifelli,
Attorneys

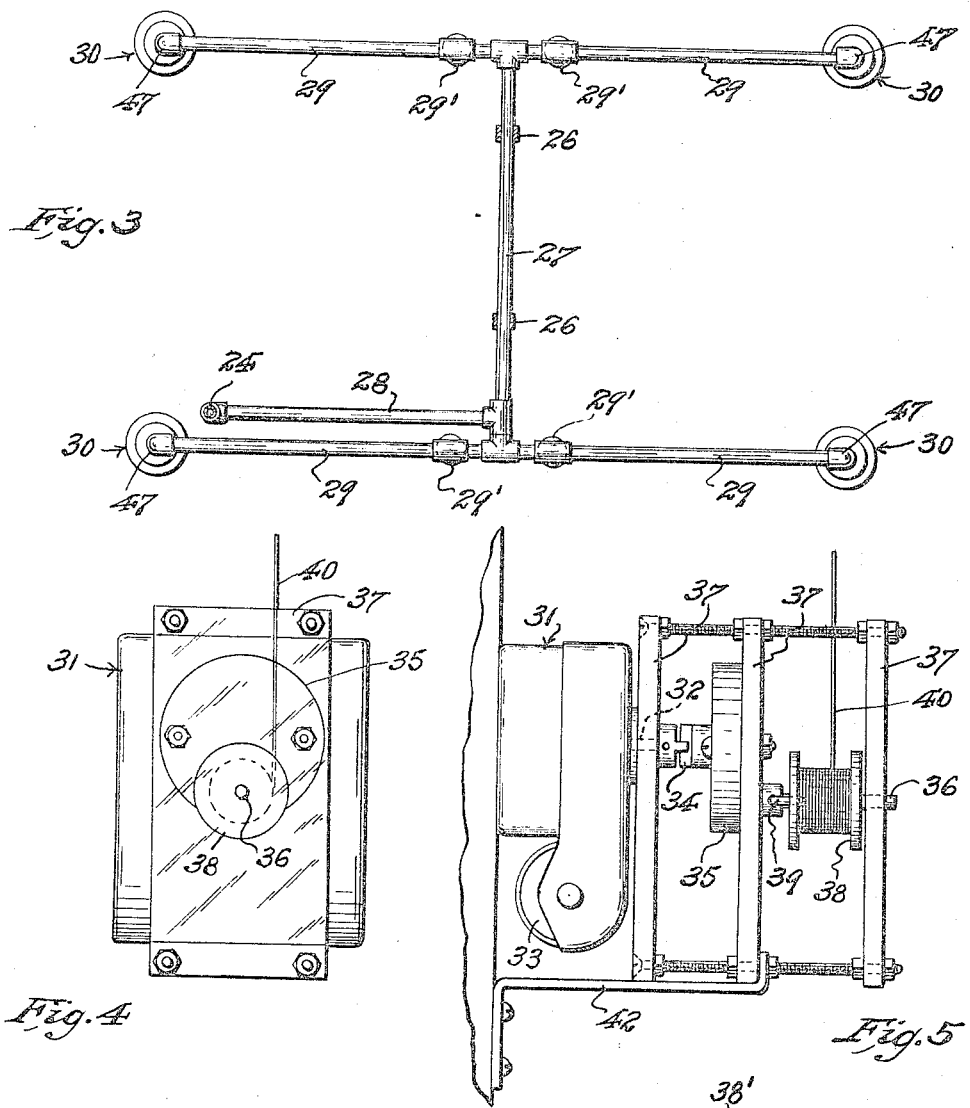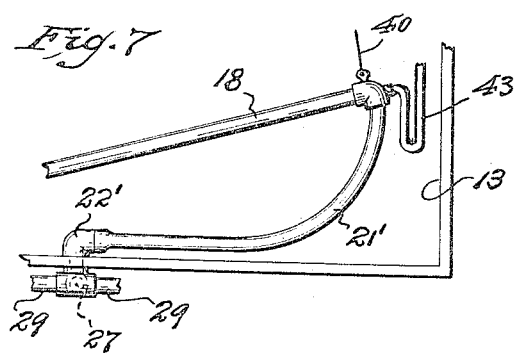

though such shape of tank is preferable, tanks of cylindrical, oval or other forms, can be used. The tank 10 can be made from wood, metal or any other suitable material. Metal material is presently the most desirable.

United States Patent Office 3,347,212
Patented Oct. 17, 1967

3,347,212
TIME CONTROLLED LIQUID DISPENSER
Philip C. Anderson and Frank Lothrop, Crete, Nebr., assignors to Feed Service Corporation, Crete, Nebr., a corporation of Nebraska
Filed Apr. 6, 1966, Ser. No. 540,553
7 Claims. (Cl. 119—51.11)

ABSTRACT OF THE DISCLOSURE

A unique, automatically, time-controlled liquid dispenser, adapted to deliver a liquid feed in desired quantity during given time periods, is provided for voluntary consumption of feed by herds of livestock. The dispenser does not require daily attention, but is operative over long periods of time.

The novel dispenser comprises a container to hold a supply of liquid feed and having a feed discharge outlet; a feed dispensing tubular control means hingedly connected in communication with the feed discharge outlet of said container, and having a free end intermediate its length, whereby to swing downward in vertical plane, under gravity, from an initial top level of the feed in the container to an ultimate bottom level of the feed therein; a clock-work motor 31; a reel 38 actuated by said motor; a cable 42 controlled by said reel 38 and connected to the free end 20 of the control means 20 in support thereof; said reel 38 being actuated by said motor 31 to effect pay off of said cable 40 to time the descent of said control means 18, 20, 21, whereby movement of the free end 20 of said control means, relative to the liquid feed level in the container 10, stops and starts feed flow through the control means; feeder means accessible to feeding animals; and feed distributing means connected between the outlet end of said control means and said feeder means.

---

This invention relates generally to liquid dispensers; and, for purposes of illustration, to automatically controlled dispensers adapted to deliver a liquid feed, in desired quantity during given time periods, for voluntary consumption by herds of livestock, and to this end to provide novel automatic means which does not require daily attention by livestock herdsmen, and which is operative over long periods of time.

The art of mass free choice supplementary liquid feeding of livestock has come into use for some time, but the dispensing of the liquid feed to feeder heads has heretofore been more or less uncontrolled and therefore uncertain, thereby resulting in either undesirable over-feeding or under-feeding.

It has also been known, with respect to prior art livestock liquid feeding equipment, to utilize various forms of feeder heads, including balls or wheels which dip into and revolve in liquid feed, thereby to deliver such feed to the animals in response to licking thereof by said animals, but with no control with respect to the amount of feed available to the animals in given periods of time.

It is an object of this invention to provide, intermediate a feed liquid tank outlet and conduit means leading to feeder heads, a dispensing control means operative to time and regulate flow of feed liquid from the supply tank to the feeder heads, whereby delivery of liquid feed available to the animals is automatically started and stopped, so that such available feed is adequate for animal consumption, but nevertheless limited to prevent over-feeding consumption.

Another object of this invention is to provide a time controlled, gravity responsive, liquid feed dispensing conduit or arm which is movable with respect to the level of feed liquid within a supply tank, and in such manner as to start and stop outflow of feed liquid from the tank under timed controlled conditions.

Other objects and further details of that which we believe to be novel and our invention will be understood from the following description of an illustrative embodiment of our invention, considered with reference to the accompanying drawings thereof, in which drawings:

FIG. 3 is a horizontal sectional view, taken on line 3—3 in FIG. 1, and showing the conduit system by which the dispensed liquid feed is delivered from the controlled dispensing means to feeder heads which are accessible to the animals to be fed;

FIG. 4 is an end elevational view of the timing mechanism by which the dispensing control means is actuated;

FIG. 5 is a side elevational view of said timing mechanism;

FIG. 7 is a fragmentary side elevational view of a modified form of the time controlled dispensing means; and FIG. 8 is a side elevational view of selectible reels or spools, of various diameters, adapted to pay out a cable or cord, operated by the timing mechanism, whereby to movably support the dispensing control means.

Like characters of reference are applied in the several above described views, to indicate corresponding parts.

Figure 1:
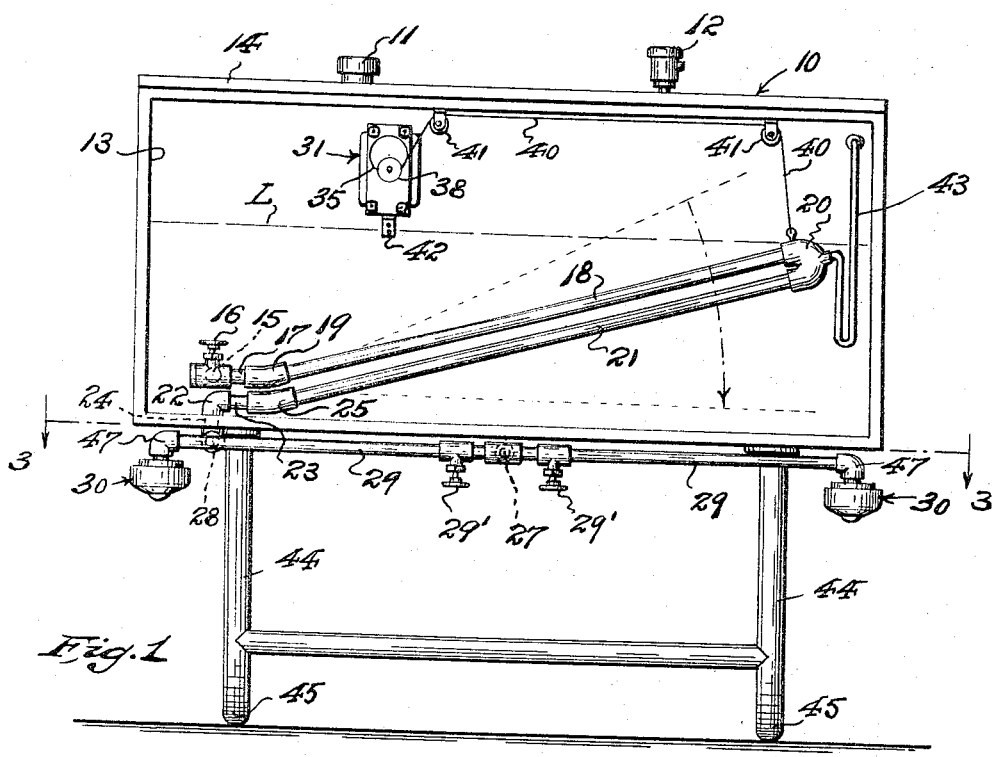
FIG. 1 is a front side elevational view of a liquid feed supply tank showing the applied time controlled dispensing means according to our invention.

Referring to the drawings, the reference character 10 indicates a tank of suitable capacity to hold a supply of liquid feed to be dispensed. Preferably this tank is of rectangular shape, of uniform horizontal cross-section from top to bottom. Although such shape of tank is preferable, tanks of cylindrical, oval or other forms, can be used. The tank 10 can be made from wood, metal or any other suitable material. Metal material is presently the most desirable.

The tank 10 and the time controlled liquid feed dispensing system (later described) is constructed to provide a sealed unit adapted to avoid escape of volatile components of the liquid feed contained therein and to be dispensed therefrom. The tank is provided at its top with filler plug means that is normally closed by a removable cap 11. The tank is also preferably provided with a pressure regulating or control device in the form of a plus or minus relief valve 12, whereby excessive positive pressure or vacuum conditions will be relieved.

The time controlled liquid feed dispensing means, hereinafter described, is located exteriorly of the tank 10, adjacent to a side wall of the latter, and is contained within an outwardly open compartment member 13 which is suitably mounted on a side of the tank body. This compartment member 13 is provided with a cover member 14 adapted to close the outwardly open side thereof, and when closed (see FIG. 2) will prevent unauthorized tampering with the contained dispensing control means, as well as to protect the latter against undesirable exposure to weather. Said cover member 14 when opened (see FIG. 1) permits access to the dispensing control means when required or desirable.

Communicating with the tank 10, adjacent to its bottom and near one end thereof, is an outlet 15, through which the liquid feed is discharged. To this outlet is joined a fixture, desirably including a shut-off valve 16 and having an angular tubular extension 17 disposed parallel to the adjacent wall of the tank. To this extension 17 is hingedly connected the inner end of a tubular control arm 18, which is formed by a rigid or non-flexible pipe or conduit. Said control arm 18 communicates with the outlet fixture so as to receive the liquid feed flowing out therethrough from the tank 10. Any suitable form of hanging means to connect the control arm 18 to the tank outlet fixture can be used. As shown, by way of illustration, this hinging connection comprises a section of flexible tubing 19. As thus hingedly connected to the tank outlet fixture, the control arm 18 is free to swing through a vertical plane, whereby its outer free end and can move downward, under gravity, from an initial upswing position adjacent the top of the tank to an ultimate down-swing position adjacent the bottom of the tank.

Connected with the outer free end of the control arm 18, as by an elbow coupling 20, is a liquid feed delivery pipe or conduit 21. This delivery pipe or conduit 21 doubles back from the outer free end of the control arm 18 to an outlet fixture 22. Said outlet fixture provides an inner horizontal tubular extension 23 and an outer vertical tubular extension 24; the latter extending through the bottom wall of the compartment member 13, to project downwardly and outwardly therefrom. The delivery pipe or conduit 21 is hingedly connected to the extension 23 of said outlet fixture 22 by any suitable form of hinging means, such e.g., as a section of flexible tubing 25; all whereby the delivery pipe or conduit 21 can swing in vertical plane in company with the control arm 18.

Suspended beneath the bottom of the tank 10, as by suitably located hanger elements 26, is a liquid feed distributing conduit system, which is operative to supply the liquid feed to one or more feeder heads which are accessible to livestock to be fed. This liquid feed distributing conduit system is subject to wide variation of arrangement, but, as illustrated, comprises a receiving conduit 27, which is connected by a delivery pipe or conduit 28 to the outlet fixture 22 through which the liquid feed is discharged from the delivery pipe or conduit 21 associated with the control arm 18. Extending from the receiving conduit 27, in opposite directions as shown, and beneath and adjacent to overlying outer side portions of the tank 10 and associated compartment 13, are branch pipes or conduits 29, which terminate in feeder heads 30. Preferably, the arrangement and location of the feeder heads 30 is such as to so position the same that, while accessible to licking feeding action by livestock, the same will not be exposed to rubbing action by the feeding animals. Preferably, the branch pipes or conduits 29 are each provided with shut-off valves 29', so that the feeder heads 30 may be respectively shut-off, as may be required, in the event of leaks or other damage to said heads, so that repairs can be made without necessity for shutting down the feeding system as a whole.

The means for timing the operative downward movement of the control arm 18 from its initial up-swing position, which disposes its outer free end adjacent to the level of the liquid feed contained in the tank 10, when the latter is full, to its ultimate down-swing position, comprises a spring powered clock-work motor 31, the hour or drive shaft 32 of which is designed to make one revolution every twelve hours.

This clock-work motor 31 is of the type wherein its power spring is wound, from time to time as required, by a winding mechanism actuated by an electric battery 33. There are several makes of clock-work motors of this kind which are commercially available, such e.g., as one manufactured and distributed by the Elgin National Watch Co., of Elgin, Ill.; another by General Electric Co., of Ashland, Mass.; and another by Westclox Division of General Time Corp., of LaSalle, Ind.; and perhaps others. If desired, switches (not shown) for starting or stopping the motor 31 may also be provided.

In the use of such clock-work motor, with respect to its function in relation to operation of the control arm 18 according to the principles of this invention, the hour or drive shaft 32 is coupled, by a suitable clutch device 34, to a gear reduction element or box 35, the internal gearing of which (not shown) comprises a large gear driven by said clutch device and a small gear to drive a spool or reel actuating lay shaft 36. As shown, a suitable framework, comprising interconnected and spaced apart from plates 37 (preferably of transparent plastic material) supports the shaft 32, gear box 35 and lay shaft 36. Mounted on said lay 36 is a reel or spool 38 of desired selected diameter, the same being keyed to said lay shaft by suitable key means 39, so as to be rotated thereby. Wound able upon reel or spool 38 is a cable or cord 40 adapted to be slowly payed off therefrom under the time controlling operation of the clock-work motor 31. This cable or cord 40 is led over one or more pulleys 41, which are suspended from the top wall of the compartment 13, and thence to an attached connection to the free end of the control arm 18 whereby the latter is supported for controlled down-swinging movement.

The clock-work motor 31 is supported in stationary position, relative to the tank 10, within the upper portion of the compartment 13, by suitable means such as a carrying bracket 42.

The descent speed of the control arm 18 is primarily determined by the clock-work motor 31 and the reduction gearing within the gear box 35, but may be varied, as desired, by employing a cable or cord reel or spool 38 of selected diameter, or by other suitable means so as to permit a uniform quantity of liquid, as a maximum to flow in a given period. It is therefore suggested that said reels or spools 38 can be provided in various diameters for selective use, and subject to interchangeable mounting on the lay shaft 36 of the clock-work motor power transmission system, according to a desired speed of descent to be permitted with respect to the control arm movement. The reels or spools 38 of various diameters may be provided in multiple form (as shown in FIG. 8) thus making available a selection of various sized reel or spool members 38', when mounted on the lay shaft 36.

Connected to the free outer end of the control arm 18, in communication therewith, is one end of a flexible tubular conduit 43, which extends upwardly therefrom so that its upper end can be connected in communication with the interior of the tank 10, above the normal level of the liquid feed contained in the latter when full. This conduit 43 serves to prevent any siphoning action by said control arm 18.

The tank 10 and its liquid feed control and distributing system may be supported, by any suitable form of carrying framework, in a permanently stationary position in a desired area of use, and at such elevation above ground level as to render the feeder heads 30 easily accessible to the livestock to be fed. However, to render the apparatus portable, if desired, the supporting framework can be provided in a skid form, to allow the apparatus to be moved from place to place, as may be desirable. As illustratively shown in FIGS. 1 and 2, a skid form of support comprises a framework formed by pipe standards 44 having lower ends curved as at 45, so as to join ground contacting runner sections 46. Any other form of supporting means, adapted to render the apparatus movable, such as a wheeled support or the like may be used. It will be understood that, when equipped with the skid type support or the like, the apparatus may be conveniently hauled about to change its location as may be desired. The feeder heads 30 of the liquid feed distributing system may optionally comprise various forms of devices adapted to render the supplied liquid feed accessible to feeding livestock. Such feeder heads may be in the form of ball or wheel dipping elements subject to licking by livestock, or may comprise open troughs or basins accessible to the livestock, and equipped with suitable liquid level limiting means.

We have found, however, that a preferable form of feeding head is of a downwardly directed licking ball type, as described and claimed in co-pending application, Ser. No. 447,620, filed on Apr. 13, 1965, by one of us, and as shown more particularly in FIG. 6 of the drawings. This preferred form of feeding head comprises head unit 30 connected to the downwardly extending branch of an elbow 47, which is joined to a pipe or conduit 29 of the liquid feed distributing system, by a vertical tubular member 48. The lower end of this tubular member 48 is threaded into an opening in a bushing 49, preferably made of plastic material. This bushing is threaded into the upper end of a chambered holder member 50, into the interior of which liquid feed F is supplied through the control and distributing system. Said holder member 50 terminates, at its lower end, in a tapered bottom wall portion 51, which defines a circular outlet opening 52 of reduced diameter. A feed ball 53, of plastic material or of plastic coated metal, is contained within the hollow interior of the holding member 50, so as to normally seat upon the margins of its opening 52, in closing relation to said opening. Said feed ball is upwardly movable within the holder member, under pressure of a licking animal's tongue, whereby to allow flow of liquid feed, through said seating opening 52, onto and so as to coat exposed surfaces of the feed ball. In a preferred construction, as shown, an anti-friction ball bearing 54 is supported by a perforate partition plate 55, which bridges the inner end portion of the bushing 49 at the upper interior of the holder member 50. This bearing 54 limits upward movement of the feed ball 53, without offering friction resistance to rotation of the latter under licking action of a feeding animal.

Figures 2, 6:
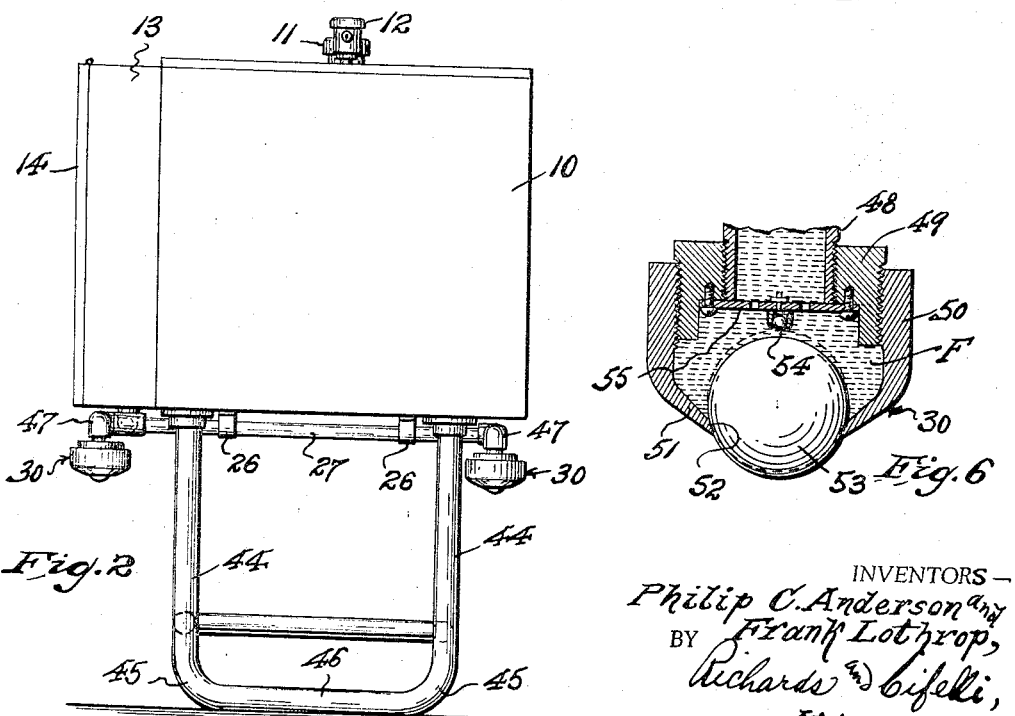
FIG. 2 is an end elevational view of the same, viewed from the right of FIG. 1.
FIG. 6 is a central sectional view, drawn on an enlarged scale, of a preferred form of feeder head with which the dispensing system is provided, subject to access by feeding animals.

Referring to FIG. 7, a modified form of the liquid feed control means is shown, wherein instead of a hinged rigid delivery pipe or conduit, to extend from the outer free end of the control arm 18 to the liquid feed distributing system, as shown in FIG. 1, a flexible delivery conduit 21' is provided; the same being coupled to a convenient part of the distributing system by an outlet elbow connection 22'.

It will be understood, that the passages of the control arm 18, delivery pipe or conduit 21 or 21', and of the distributing conduit system are provided in sufficient diameter so that even if the liquid feed becomes somewhat viscous in cold weather, it will nevertheless be assured dispensing flow in desired quantity to the feeder heads 30, under controlled dispensing performance according to the principles of this invention. Thus, our apparatus is useful over all ambient weather conditions, e.g., from 30° F. to 120° F., or even outside this range.

In operation of the apparatus, in use, assuming the tank 10 to be full, the cable or cord 40 reeled up so as to support the control arm 18 in an initial upswing position, wherein its outer outlet end is positioned just below the top level of the liquid feed contained in the tank, and the clock-work motor 31 is started in operation, liquid feed will flow through said control arm and the delivery pipe or conduit 21 or 21' to the distributing system, whereby to supply the liquid feed to the feeder heads 30, subject to consumption by feeding livestock.

The operating clock-work motor 31 will rotate the wheel or spool 38 at a selected predetermined speed, whereby to gradually pay off therefrom the cable or cord 40, so as to allow the control arm 18 to swing down, under gravity, and thus to descend with predetermined timed movement.

It will be understood that the level of liquid feed contained in the control arm 18 will seek to match the level of liquid feed in the tank 10. By reason of this, when the outlet end of the control arm 18 is near but beneath the level of liquid feed within the tank 10, said liquid feed will flow out of said control arm into the delivery pipe or conduit 21 or 21', and thence to the feeder heads 30 as aforesaid. If the consumption of liquid feed by feeding livestock lowers the level of liquid feed in tank 10, faster than the descending movement of the outlet end of the control arm 18, the feed liquid level in the tank 10 will be temporarily below the outlet end of the control arm, and consequently the level of liquid feed within the control arm, matching the tank level, will not reach said outlet end of the control arm, and therefore flow of liquid feed to the feeder heads 30 will stop, and will not be resumed until, under time controlled descent of the control arm, the outlet end of the latter again is disposed beneath the liquid feed level within the tank.

By providing a tank 10 of suitable capacity and by use of a clock motor driven reduction gearing, together with a selected size of reel or spool to pay off the cable or cord restraining control arm 18, the time taken for the control arm to move, under gravity, from an initial upswing position to an ultimate down-swing position, can be so rated as to assure automatic operation of the apparatus over a long period of time, e.g., of fifteen to one-hundred and fifty days, without requiring daily attention of herdsmen. The apparatus, thus operating, is designed to deliver to the feeder heads 30 a predetermined number of gallons of liquid feed during each twenty-four hour period of use, accordingly as consumption demand by feeding livestock may require.

The battery for actuating the clock spring rewinding means will last for a year or more before replacement is required. Consequently, the apparatus requires little attention, except to refill the tank 10 with liquid feed when necessary.

As will be evident from the foregoing description, certain aspects of our invention are not limited to the particular details of construction of the examples illustrated, and we contemplate that various other modifications and applications will occur to those skilled in the art. It will also be evident that we have provided improved animal liquid feed dispensing apparatus which achieves the stated objects of our invention. It is, therefore, our intention that the herefollowing claims shall cover all modifications and applications of the invention as do not depart from the spirit and scope of the invention as defined by said claims.

We claim:

1. A liquid dispensing apparatus, comprising: a container to hold a supply of liquid; a liquid dispensing tubular control means hingedly connected in communication with the liquid discharge outlet of said container, whereby to swing downward in a vertical plane, under gravity, and having a free end, from an initial top level of the liquid in the container to an ultimate bottom level of the liquid therein; timer control means for regulating the down swing of said control means under timed restraint; liquid feeder means accessible to feeding animals, liquid distributing means connected between the outlet end of said liquid dispensing tubular control means and the feeder means, and anti-syphon means above the liquid level, comprising a flexible tubular connection in flow communication with and between the outlet end of said liquid dispensing control means and the upper interior of the container.

2. A liquid feed dispensing apparatus for animal feeding comprising: a container to hold a supply of liquid feed and having a feed discharge outlet; a feed dispensing tubular control means hingedly connected in communication with the feed discharge outlet of said container and having a free end intermediate its length, whereby to swing downward in a vertical plane, under gravity, from an initial top level of the feed in the container to an ultimate bottom level of the feed therein; a clock-work motor; a reel actuated by said motor; a cable controlled by said reel and connected to the free end of the control means in support thereof; said reel being actuated by said motor to effect pay off of said cable to time the descent of said control means, whereby movement of the free end of said control means, relative to the liquid feed level in the container, stops and starts feed flow through the control means; feeder means accessible to feeding animals; and feed distributing means connected between the outlet end of said control means and said feeder means.

3. A liquid feed dispensing apparatus for animal feeding according to claim 2, including a flexible tubular connection between the free end of the control means and the upper interior of the feed container.

4. A liquid feed dispensing apparatus for animal feeding according to claim 2, including means to support the liquid feed container and its dispensing control means at an elevation above ground level, whereby to dispose the feeder means in position easily accessible to feeding animals.

5. A liquid feed dispensing apparatus for animal feeding according to claim 2, including means to support the liquid feed container and its dispensing control means at an elevation above ground level, whereby to dispose the feeder means in position easily accessible to feeding animals, and wherein said supporting means is of suitable type to render the apparatus movable from place to place as may be desired.

6. A liquid feed dispensing apparatus for animal feeding according to claim 2, wherein the feeder means comprises one or more downwardly directed feeder heads, each comprising a hollow body to receive liquid feed and having a bottom wall provided with a circular opening therein; a round ball of somewhat larger diameter than that of said opening and adapted to engage the perimeter of said opening to normally close the same but upwardly movable to open the same; said ball providing a portion projecting exteriorly from the body and accessible to licking action by a feeding animal.

7. A liquid feed dispensing apparatus for animal feeding according to claim 2, wherein the clock-work motor is spring operated and includes an electric battery energized re-winding means.

References Cited
UNITED STATES PATENTS

| | | | |
|---|---|---|---|
| 2,678,630 | 5/1954 | Frederiksen | 119—75 |
| 3,081,738 | 3/1963 | Heron | 119—71 |
| 3,192,902 | 7/1965 | Gammill | 119—51.11 |
| 3,216,397 | 11/1965 | Pichard | 119—71 |
| 3,254,729 | 6/1966 | Behlen | 119—51 X |

SAMUEL KOREN, *Primary Examiner.*

HUGH R. CHAMBLEE, *Examiner.*